Patented Nov. 26, 1935

2,022,149

UNITED STATES PATENT OFFICE 2,022,149

COATING COMPOSITION

Ernest G. Peterson, Wilmington, Del., assignor to Hercules Powder Company, Wilmington, Del., a corporation of Delaware No Drawing. Application October 8, 1932, Serial No. 636,938

6 Claims. (Cl. 134—26)

This invention relates to an improvement in coating composition for use variously in the commercial arts. The coating composition in accordance with this invention may be, for example, of the type shown as a varnish or of the type including a cellulose ester as an ingredient and generally known as a lacquer.

The coating composition in accordance with this invention will include as an essential ingredient a synthetic resin comprising a polyhydric alcohol combined partly with terpinene maleic anhydride and partly with a fatty acid. The synthetic resin may in addition be partly combined with a resin acid. The synthetic resin, an essential ingredient of coating compositions in accordance with this invention, may be characterized as a reaction product of a polyhydric alcohol with terpinene maleic anhydride and a fatty acid or a reaction product of a polyhydric alcohol with terpinene maleic anhydride, a fatty acid and a resin acid.

The coating compositions in accordance with this invention will also include essentially a solvent for the synthetic resin and where the compositions are of the type generally known as lacquer a cellulose ester will also be included as an essential ingredient. Where the coating compositions in accordance with this invention are of the varnish type the synthetic resin will be dissolved in a suitable drying oil.

Coating compositions in accordance with this invention may, depending upon the characteristics desired for them and the particular purpose for which they are intended, contain various ingredients such, for example, as suitable diluents for adjustment of viscosity, pigments, plasticizers, other gums or resins, etc., such as are commonly used in coating compositions of the types contemplated.

In the formulation of compositions in accordance with this invention the synthetic resin may be used in widely varying proportions, depending upon the particular type of coating composition to be produced, and the use for which it is intended and the particular synthetic resin used. Thus, it will be appreciated that the amount of synthetic resin used in any particular composition will depend upon the characteristics desired for the composition and upon the particular synthetic resin used.

The various ingredients which may be included in coating compositions in accordance with this invention in addition to synthetic resin, such as solvent, diluent, cellulose ester, pigments, plasticizers, etc., may be used in widely varying proportions, depending upon the characteristics desired for use in any given composition, the use for which it is intended and the nature of the particular synthetic resin used. The amounts and relative proportions of the various ingredients may be readily determined by those skilled in the art in the light of the intended use of and the particular resin to be used in any given composition.

In the formulation of compositions, as lacquers in accordance with this invention various cellulose esters may be used as, for example, nitrocellulose, which may be of so-called high viscosity, i. e. say above five seconds, or of so-called low viscosity, say below five seconds, cellulose butyrate, cellulose butyro acetate, etc. Ordinary solvents for the cellulose ester may be used, as for example, ethyl acetate, ethylene dichloride, amyl acetate, ethyl lactate, etc. and the ordinary diluents, as for example, toluol, ethyl alcohol, butyl alcohol, etc. may be used. The usual pigments, such as lithopone, titanium dioxide, Prussian blue, etc. and plasticizers usually used in lacquers, as for example, dibutyl phthalate, tricresyl phosphate, etc. may likewise be used. Oils, gums, resins, etc. as heretofore used in lacquers may also be included as desired.

In the formulation of compositions, as varnishes, in accordance with this invention, various oils, solvents and other ingredients used in varnishes may be used. Thus, for example, linseed oil, tung oil, etc. may be used. As the solvents and diluents there may be used turpentine, dipentine, xylol, toluol, mineral spirits, etc. The composition may contain also any desired pigment used in varnishes, it may contain gums or resins, as copal, sandarac, etc. in addition to the synthetic resin, and it may contain other ingredients of varnishes, as lead linoleate, cobalt linoleate, etc.

It will be understood that in the formulation of so-called lacquer, that is, a coating composition including cellulose ester, that the particular cellulose ester used will be chosen with respect to its compatibility with the resin used. Likewise, in the formulation of a composition of the oil-varnish type, a resin which will be compatible with the oil used in the formulation will be chosen.

The synthetic resin included as an essential ingredient of compositions in accordance with this invention, as indicated above, will involve a reaction product of a polyhydric alcohol, such as glycerol, polyglycerol, glycol, as ethylene glycol, propylene glycol, diethylene glycol, or the like, etc. with terpinene-maleic anhydride and a fatty acid. In forming the synthetic resin the polyhydric alcohol may be substituted for by a substituted polyhydric alcohol, as, for example, glycerol mono-acetate, glycerol mono-ethyl ether, glycerol mono-chlorohydrin, etc. Further, the synthetic resin may comprise a reaction product of a polyhydric alcohol or a substituted polyhydric alcohol, terpinene maleic anhydride, a fatty acid and a resin acid. The terpinene maleic anhydride for use in the formation of the synthetic resin may be readily produced by reacting alpha-terpinene with maleic acid or maleic anhydride in the presence of heat.

The fatty acid for use in forming the synthetic resin may be a saturated or unsaturated fatty acid and may be, for example, stearic acid, oleic acid, ricinoleic acid, a linseed oil fatty acid, or the like, etc. Where the reaction for the production of synthetic resin includes a resin acid in addition to the fatty acid, the resin acid may be a natural resin or resin acid, as, for example, rosin, abietic acid, pimaric acid, Congo copal, or the like, etc.

In producing the synthetic resin the reagents; i. e. polyhydric alcohol or substituted polyhydric alcohol, terpinene maleic anhydride, a fatty acid or fatty acid and resin acid will be reacted under any suitable conditions for their reaction. Thus, for example, the reaction may be carried out in the presence of heat in any suitable form of apparatus and desirably with agitation, as by stirring. On completion of the reaction excess of polyhydric alcohol or substituted polyhydric alcohol and an excess will desirably be used, will be removed, for example, by distilling it off under reduced pressure.

The following examples will serve to illustrate the modus operandi for the production of a synthetic resin of the type contemplated as essential ingredients of coating compositions in accordance with this invention.

*Example 1.*—340 parts by weight of terpinene maleic anhydride, 213 parts of stearic acid and 140 parts of glycerol are admixed and heated at a temperature of about 190–200° C. for eight hours with the production of a synthetic resin which is of a light color and soluble in the usual lacquer solvents and compatible with nitrocellulose and plasticizers in practically all proportions.

*Example 2.*—235 parts by weight of terpinene maleic anhydride, about 325 parts of ricinoleic acid, or castor oil fatty acids and 95 parts of glycerol are admixed and heated at a temperature of about 210° C. for 8 to 10 hours. The resin produced will be soluble in the usual lacquer solvents and compatible with nitrocellulose and plasticizers in practically all proportions.

*Example 3.*—234 parts by weight of terpinene maleic anhydride, 283 parts of a mixture of fatty acids produced by the saponification of linseed oil and 92 parts of glycerol are admixed and heated to form a homogeneous solution. To the solution 92 parts of glycerol are added and the mixture heated to a temperature of 210° C. The temperature is then raised to about 250° C. and maintained for about two hours. Desirably the reaction is carried out in a vessel of such shape and construction that air may be excluded from the reaction mixture in order to prevent oxidation of the fatty acids, for example, carbon dioxide or nitrogen gas, may be passed into the vessel during heating. The resin produced will be a viscous liquid at ordinary temperatures of light color and very clear and transparent.

*Example 4.*—234 parts by weight of terpinene maleic anhydride, 165 parts of rosin (A. N. 170) and 146 parts of fatty acids derived from linseed oil, are heated together at about 150° C. until a homogeneous mixture results, when 92 parts of glycerol are added. The mixture is then heated at a temperature of about 200° C. until the evolution of water vapor ceases, usually a period of from about 8 to 10 hours. The reaction mixture is protected from contact with air in order to avoid oxidation of the fatty acids. Protection will be afforded by the use of a suitable apparatus into which carbon dioxide or nitrogen gas may be passed during the reaction period. The resin produced will be a soft, adhesive solid, exceptionally light in color.

As illustrative of coating compositions in accordance with this invention, made up with use, for example, of the synthetic resins illustrated above by Examples 1 to 4, for example, a lacquer containing as an essential ingredient a synthetic resin produced in accordance with Example 1, above, may be made up on the following formula:

*Formula 1 (lacquer)*

| | Parts by weight |
|---|---|
| Nitrocellulose (½ second) | 10 |
| Synthetic resin (Example 1) | 10 |
| Dibutyl phthalate | 2 |
| Butyl acetate | 30 |
| Toluol | 48 |

As further illustrative using a synthetic resin produced in accordance with Example 2, a satisfactory lacquer may be produced as follows:

*Formula 2 (lacquer)*

| | Parts by weight |
|---|---|
| Nitrocellulose (½ second) | 10 |
| Synthetic resin (Example 2) | 10 |
| Dibutyl phthalate | 2 |
| Butyl acetate | 30 |
| Toluol | 48 |

As further illustrative, for example, using a synthetic resin produced in accordance with Example 3, above, a satisfactory varnish may be made up as follows:

*Formula 3 (varnish)*

| | Parts by weight |
|---|---|
| Synthetic resin (Example 3) | 100 |
| Tung oil | 46 | are heated together to a temperature of about 285° C. The mixture is then cooled to about 225° C. and thinned with equal parts of a 1 to 1 mixture of turpentine and mineral spirits. 1 part by weight of cobalt linoleate and lead linoleate are then added.

It will be understood that from the practical standpoint there is no limitation in connection with the amount of oil to be used, the kind of varnish being the determining factor. The non-volatile content of the varnish may also vary between wide limits according to the consistency desired for the finished product. For example, 40–50% of non-volatile ingredients give a varnish of good consistency for brush application. In the above exemplified varnish any pigment ordinarily used in making varnish may be included. Varnish of the type exemplified above will be found to dry tack-free in three to five hours, to be very resistant to water and of excellent durability The varnish will also be found to be of a very light color.

The synthetic resin, the production of which is exemplified in Example 3 above, may also be used for the formulation of a lacquer. Thus, for example, a lacquer containing synthetic resin in accordance with Example 3 above may be made up on the following formula:

*Formula 4 (lacquer)*

| | Parts by weight |
|---|---|
| Nitrocellulose (½ second) | 7½ |
| Synthetic resin | 10 |
| Toluol | 39 |
| Butyl acetate | 39 |

As further illustrative, for example, a synthetic resin made up as described in Example 4 above, may be used for the production of a satisfactory varnish as follows:

About 100 parts by weight of synthetic resin and 50 parts by weight of tung oil are heated to 300° C. The mixture is then cooled to about 225° C. and thinned with equal parts of a 1 to 1 mixture of turpentine and mineral spirits. 1 part by weight each of cobalt linoleate and lead linoleate are added.

The synthetic resin produced in accordance with Example 4 may otherwise be used in the formulation of a satisfactory lacquer. Thus, for example, a lacquer may be made up on the following formula:

*Formula 5 (lacquer)*

| | Parts by weight |
|---|---|
| Nitrocellulose (½ second) | 10 |
| Synthetic resin (Example 4) | 10 |
| Dibutyl phthalate | 3 |
| Toluol | 40 |
| Butyl acetate | 37 |

The varnishes illustrated by the several formulæ above will be found to dry tack-free in the period of 3 to 5 hours, to be very resistant to water and of excellent durability. They will be found to be of an exceptionally light color. The lacquers illustrated by the several formulæ above will be found to dry tack-free in from 10–20 minutes and to have the hardness of a well plasticized finish. It will be appreciated that desirable hardness and resistance to abrasion may be obtained in the lacquers by following the ratio of non-volatile material.

It will now be understood that this invention from the broad standpoint contemplates coating compositions, as lacquers, or varnishes, including a synthetic resin of the type described; that is to say, one formed by the reaction of a polyhydric alcohol, terpinene-maleic anhydride and a fatty acid or a fatty acid and a resin acid. It will be understood that it is not intended that this invention shall be in any wise limited by the lacquers or varnishes given herein by way of illustration. It will be understood that the coating compositions illustrated may include the synthetic resins of the type contemplated in any desired proportions and with other ingredients of desired type and in desired proportions within wide ranges, depending upon the characteristics desired for the coating composition and upon the ultimate use for which the coating composition is intended. It will be appreciated that where nitrocellulose is used in the formulation of, for example, a lacquer, such may be of any desired viscosity.

Applicant does not claim herein the synthetic resin comprising a polyhydric alcohol-terpinene maleic anhydride-fatty acid reaction product per se, since such is described and claimed in applicant's copending application Serial No. 598,871, filed March 14, 1932 patented March 5, 1935, No. 1,993,028. Nor does applicant claim herein a polyhydric alcohol-terpinene maleic anhydride-fatty acid-resin or resin acid reaction product per se, since such is described and claimed in applicant's copending application Serial No. 585,163, filed January 6, 1932.

What I claim and desire to protect by Letters Patent is:

1. A coating composition including as ingredients raw linseed oil and a synthetic resin comprising the reaction product of a polyhydric alcohol, terpinene-maleic anhydride and a fatty acid.

2. A coating composition including as ingredients raw linseed oil and a synthetic resin comprising the reaction product of a polyhydric alcohol, terpinene-maleic anhydride and a saturated fatty acid.

3. A coating composition including as ingredients raw linseed oil and a synthetic resin comprising the reaction product of a polyhydric alcohol, terpinene-maleic anhydride and an unsaturated fatty acid.

4. A coating composition including as ingredients raw linseed oil and a synthetic resin comprising the reaction product of glycerol, terpinene-maleic anhydride and a fatty acid.

5. A coating composition including as ingredients raw linseed oil and a synthetic resin comprising the reaction product of an aliphatic glycol, terpinene-maleic anhydride and a fatty acid.

6. A coating composition including as ingredients linseed oil and a synthetic resin comprising the reaction product of a polyhydric alcohol, terpinene-maleic anhydride and a fatty acid.

ERNEST G. PETERSON.